(12) United States Patent
Goering et al.

(10) Patent No.: US 9,510,511 B2
(45) Date of Patent: Dec. 6, 2016

(54) ROTARY BRUSH FOR CLEANING ROUND MODULE BUILDER BELTS

(71) Applicant: Deere & Company, Moline, IL (US)

(72) Inventors: Kevin J. Goering, Cambridge, IA (US); John O. Rumohr, Pleasant Hill, IA (US); Rakesh Madurwar, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/688,100

(22) Filed: Apr. 16, 2015

(65) Prior Publication Data
US 2016/0302359 A1  Oct. 20, 2016

(51) Int. Cl.
*A01F 15/18* (2006.01)
*A01F 15/07* (2006.01)
*A01D 75/18* (2006.01)

(52) U.S. Cl.
CPC ............ *A01D 75/187* (2013.01); *A01F 15/07* (2013.01); *A01F 15/18* (2013.01); *A01F 2015/183* (2013.01); *A01F 2015/186* (2013.01)

(58) Field of Classification Search
CPC .... A01F 15/07; A01F 15/0715; A01F 15/10; A01F 15/106; A01F 2015/077; A01F 2015/078; A01F 2015/186; B65B 11/045; A01D 75/183
USPC ................. 100/5, 35, 40, 76, 87, 88; 56/341
See application file for complete search history.

(56) References Cited

U.S. PATENT DOCUMENTS

| | | | | |
|---|---|---|---|---|
| 2,216,304 A * | 10/1940 | Thornton | ............. | B65G 45/105 198/494 |
| 3,983,888 A * | 10/1976 | Edwards | ................ | B65G 45/18 134/6 |
| 4,782,652 A * | 11/1988 | White | ..................... | A01F 15/07 100/88 |
| 4,890,449 A * | 1/1990 | Hering | .................... | A01F 15/07 56/341 |
| 4,914,900 A * | 4/1990 | Viaud | ................. | A01F 15/0705 100/88 |
| 5,080,009 A * | 1/1992 | Fritz | ....................... | A01F 15/07 100/88 |
| 5,097,760 A * | 3/1992 | Ratzlaff | .................. | A01F 15/07 100/88 |
| 5,394,682 A * | 3/1995 | Frimml | ................. | A01F 15/106 460/122 |
| 5,497,872 A * | 3/1996 | Pennino | ................. | B65G 45/20 198/496 |
| 5,931,089 A * | 8/1999 | Viesselmann | ........... | A01F 15/07 100/88 |
| 6,032,446 A * | 3/2000 | Gola | ........................ | A01F 15/00 100/151 |
| 6,964,331 B1 * | 11/2005 | Kerr | ....................... | B65G 45/18 198/496 |
| 8,037,814 B1 * | 10/2011 | Smith | ..................... | A01F 15/07 100/88 |
| 8,776,679 B1 * | 7/2014 | Henry | ................. | A01F 15/0883 100/2 |

* cited by examiner

Primary Examiner — Jimmy T Nguyen

(57) ABSTRACT

A round module builder for forming a round module. The round module comprises a feeder and a module-forming portion. The module-forming portion comprises at least one baler belt configured to receive a crop from the feeder, at least one baler roller sheave configured to drive the baler belt, and a module-forming chamber. The module-forming portion is configured to receive the crop and rotate the crop in the module-forming chamber into the round module. A powered brush is coupleable to the module-forming portion above the feeder and at least one of positioned in contact with the baler belt and positioned adjacent the baler belt. The powered brush is configured to remove the crop from the baler belt outside the module-forming chamber and return the crop to the feeder which returns the crop to the module-forming chamber where the crop is formed into the round module.

20 Claims, 7 Drawing Sheets

ROTARY BRUSH FOR CLEANING ROUND MODULE BUILDER BELTS

FIELD OF THE DISCLOSURE

The present disclosure generally relates to round module builders, and more particularly to a rotary brush for round module builders.

BACKGROUND OF THE DISCLOSURE

In order to keep the baler belt free from crop and debris, an operator can manually remove crop and debris from the baler belt.

SUMMARY OF THE DISCLOSURE

In one embodiment, a round module builder for forming a round module is disclosed. The round module comprises a feeder and a module-forming portion. The module-forming portion comprises at least one baler belt configured to receive a crop from the feeder, at least one baler roller sheave configured to drive the baler belt, and a module-forming chamber. The module-forming portion is configured to receive the crop and rotate the crop in the module-forming chamber into the round module. A powered brush is coupleable to the module-forming portion above the feeder and at least one of positioned in contact with the baler belt and positioned adjacent the baler belt. The powered brush is configured to remove the crop from the baler belt outside the module-forming chamber and return the crop to the feeder which returns the crop to the module-forming chamber where the crop is formed into the round module.

In another embodiment, a harvester is disclosed. The harvester comprises a harvesting structure configured to remove a crop from a field. An accumulator is in communication with the harvesting structure for receiving crop therefrom. A feeder is in communication with the accumulator for receiving crop therefrom. The feeder is configured to compress the crop. The harvester comprises a round module builder for forming a round module. The round module builder comprises a module-forming portion comprising at least one baler belt configured to receive a crop from the feeder. At least one baler roller sheave is configured to drive the baler belt. The round module builder comprises a module-forming chamber. The module-forming portion is configured to receive the crop and rotate the crop in the module-forming chamber into the round module. A powered brush is coupleable to the module-forming portion and at least one of positioned in contact with the baler belt and positioned adjacent the baler belt. The powered brush is configured to remove the crop from the baler belt outside the module-forming chamber and return the crop to the feeder which returns the crop to the module-forming chamber where the crop is formed into the round module.

In yet another embodiment, a method for forming a round module is disclosed. A feeder is provided. A module-forming portion is provided. The module-forming portion comprises at least one baler belt configured to receive a crop from the feeder. At least one baler roller sheave is configured to drive the baler belt. The module-forming portion comprises a module-forming chamber. The module-forming portion is configured to receive the crop and rotate the crop in the module-forming chamber into the round module. A powered brush is initiated. The powered brush is coupleable to the module-forming portion. The powered brush is configured to remove the crop from the baler belt outside the module-forming chamber and return the crop to the feeder which returns the crop to the module-forming chamber where the crop is formed into the round module.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
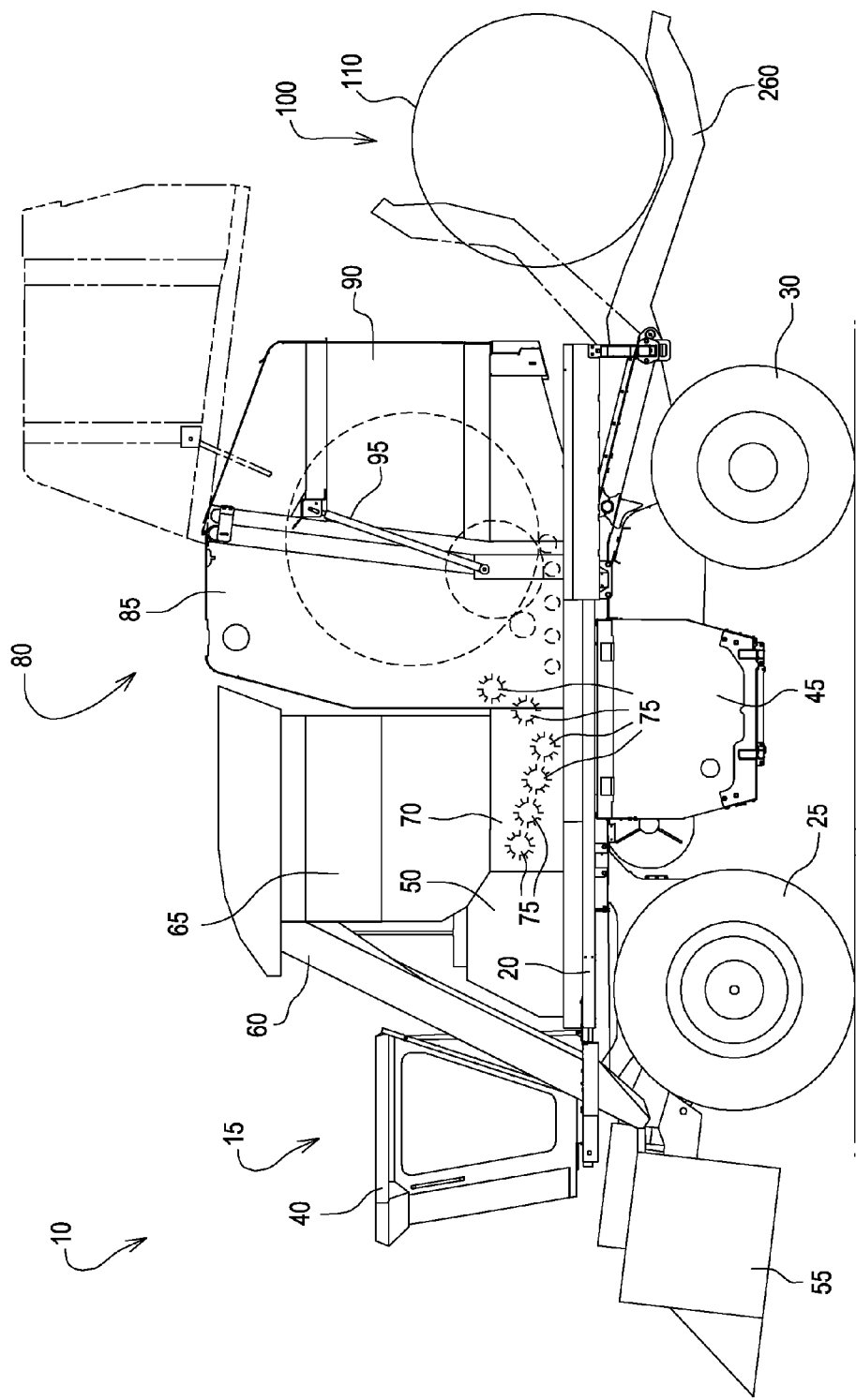
FIG. 1 is a side view of a harvester including a round module builder according to one embodiment.

FIG. 1 illustrates a harvester 10 according to one embodiment. The illustrated harvester 10 is a cotton harvester 15. Alternatively, the harvester 10 may be a hay, corn stalk, corn stover, straw, silage, or other crop harvester.

The harvester 10 includes a chassis 20. The chassis 20 is supported by front wheels 25 and rear wheels 30. Alternatively, the chassis 20 may be supported by two wheels only (e.g., hay baler). The harvester 10 is adapted for movement through a field 35 to harvest cotton, hay, corn stalk, corn stover, straw, silage, or other crop. An operator station 40 is supported by the chassis 20. A power module 45 may be supported by the chassis 20. Water, lubricant, and fuel tanks, indicated generally at 50, may be supported by the chassis 20.

A harvesting structure 55 is coupleable to the chassis 20. The illustrated harvesting structure 55 is configured to remove cotton from the field 35. Alternatively, the harvesting structure 55 may be configured to remove hay, corn stalk, corn stover, straw, silage, or other crop. An air duct system 60 is coupleable to the harvesting structure 55. An accumulator 65 is coupleable to the air duct system 60. The accumulator 65 is configured to receive cotton, or other crop, from the harvesting structure 55 via the air duct system 60. A feeder 70 is coupleable to the chassis 20. The feeder 70 is configured to receive cotton, or other crop, from the accumulator 65. The feeder 70 includes a plurality of rollers 75 configured to compress the cotton, or other crop, and transfer the cotton, or other crop, to a round module builder 80.

The illustrated round module builder 80 includes a first module-forming portion 85 in communication with the feeder 70 for receiving the crop therefrom. A second module-forming portion 90 is pivotally coupleable to the first module-forming portion 85. An extendable and retractable cylinder 95 is coupleable to the second module-forming portion 90. The extendable and retractable cylinder 95 is configured to pivot the second module-forming portion 90 relative to the first module-forming portion 85. The first and second module forming portions 85, 90 of the round module builder 80 are configured to form a round module or bale 100 of cotton or other crop.

Figure 2:
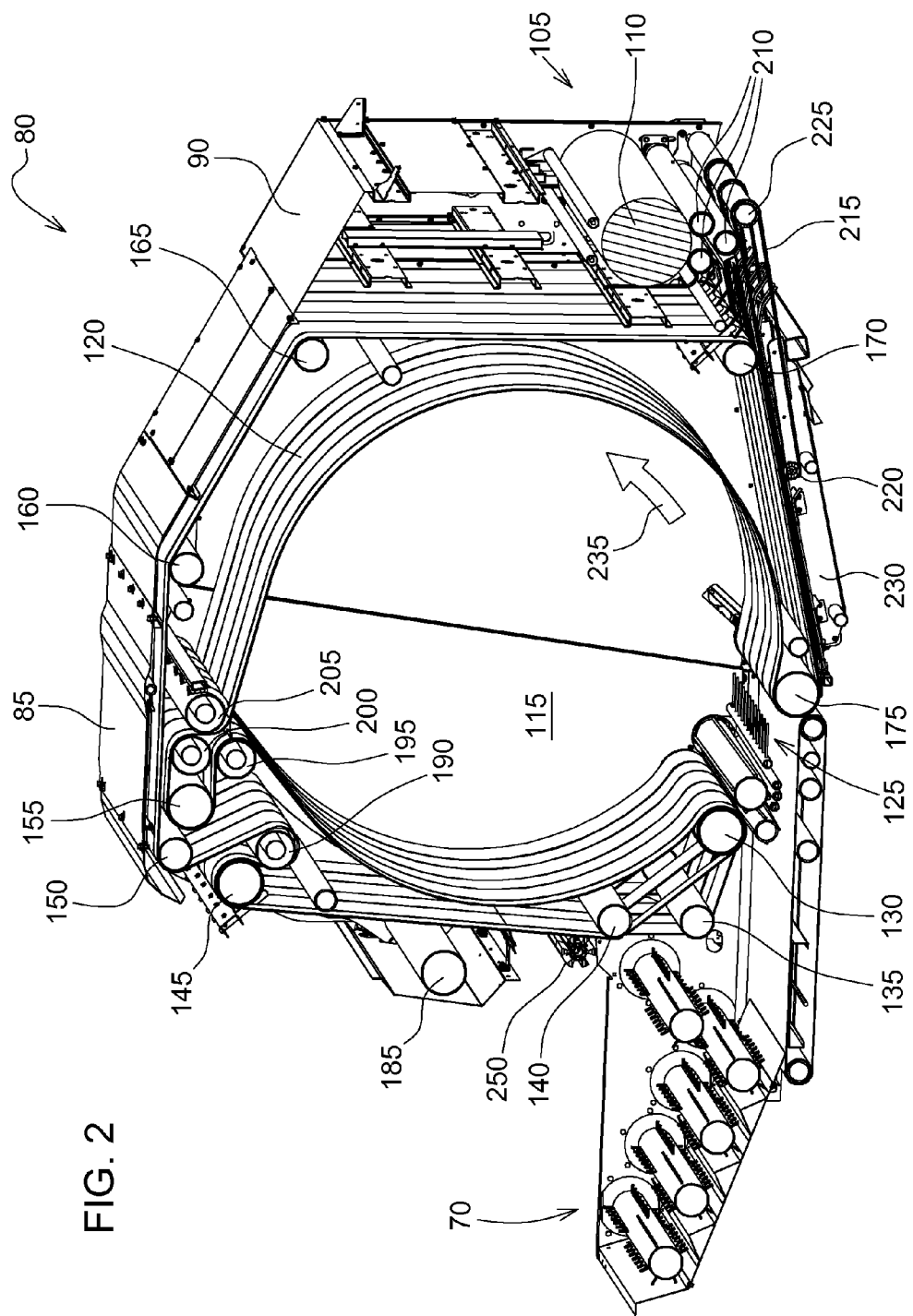
FIG. 2 is a partial perspective view of the round module builder of FIG. 1.

With reference to FIG. 2, a wrapping device 105 is coupleable to at least one of the first module-forming portion 85 and the second module-forming portion 90. The wrapping device 105 is configured to position a wrap 110 onto the round module 100 in a module-forming chamber 115 of the round module builder 80.

The module-forming chamber 115 is similar to the module-forming chamber disclosed in commonly assigned U.S. Pat. No. 8,087,216, which is hereby incorporated by reference. A plurality of baler belts 120 define the circumference of the module-forming chamber 115. The plurality of baler belts 120 are supported in a side-by-side relationship across a support roll arrangement comprising a plurality of fixed rolls and a plurality of movable rolls. Specifically, proceeding clockwise from a chamber inlet 125 where crop enters the module-forming chamber 115, the plurality of fixed rolls include a lower drive roll 130, a first separation roll 135, a second separation roll 140, an upper drive roll 145, an upper front frame roll 150, an upper rear frame roll 155, an upper front gate roll 160, an upper rear gate roll 165, a lower rear gate roll 170, and a lower front gate roll 175 all coupled for rotation within the round module builder 80.

Figure 3:
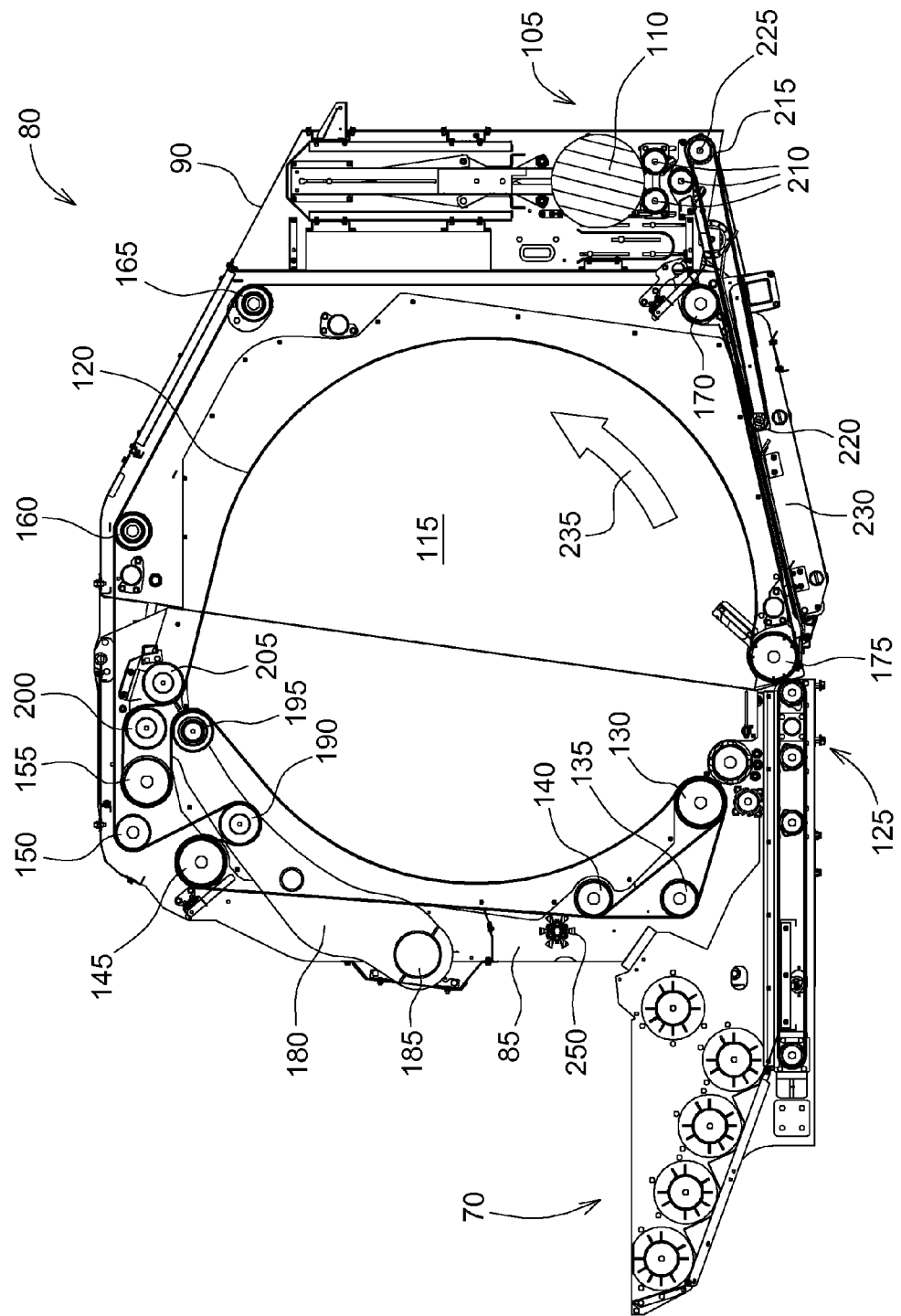
FIG. 3 is a partial side view of the round module builder of FIG. 1.

Referring to FIG. 3, a pair of transversely-spaced belt tensioning arms 180 are pivotally mounted to a belt tensioning arm pivot 185. With reference to FIGS. 2 and 3, the plurality of movable rolls comprise a first movable roll 190, a second movable roll 195, a third movable roll 200, and a fourth movable roll 205, which extend between and have opposite ends, respectively, rotatably coupled to the transversely-spaced belt tensioning arms 180. As illustrated, one or more baler roller sheaves 182 (FIG. 4) are coupleable to one or more of the fixed rolls. The baler roller sheaves 182 are driven so as to cause the plurality of baler belts 120 to be driven, with the drive direction being such as to cause the incoming cotton, or other crop, to travel counterclockwise as it is added as a spiral layer to the growing round module 100. As the round module 100 grows within the module-forming chamber 115, the transversely-spaced belt tensioning arms 180 rotate counterclockwise until a round module 100 having a predetermined diameter has been formed in the module-forming chamber 115. Then the wrap 110 is applied to the round module 100 via the wrapping device 105.

The wrapping device 105 comprises a plurality of rubber wrap baler roller sheaves 210 that guide the wrap 110. A wrapping device belt 215 is positioned over a wrapping device sheave 220 and driven by a rear power shaft 225. When driven, the wrapping device belt 215 leads the wrap 110 along a wrap guide structure 230 and into the module-forming chamber 115, by way of the inlet 125, where the wrap 110 is positioned onto the round module 100 in the direction of the arrow 235.

Figure 4:
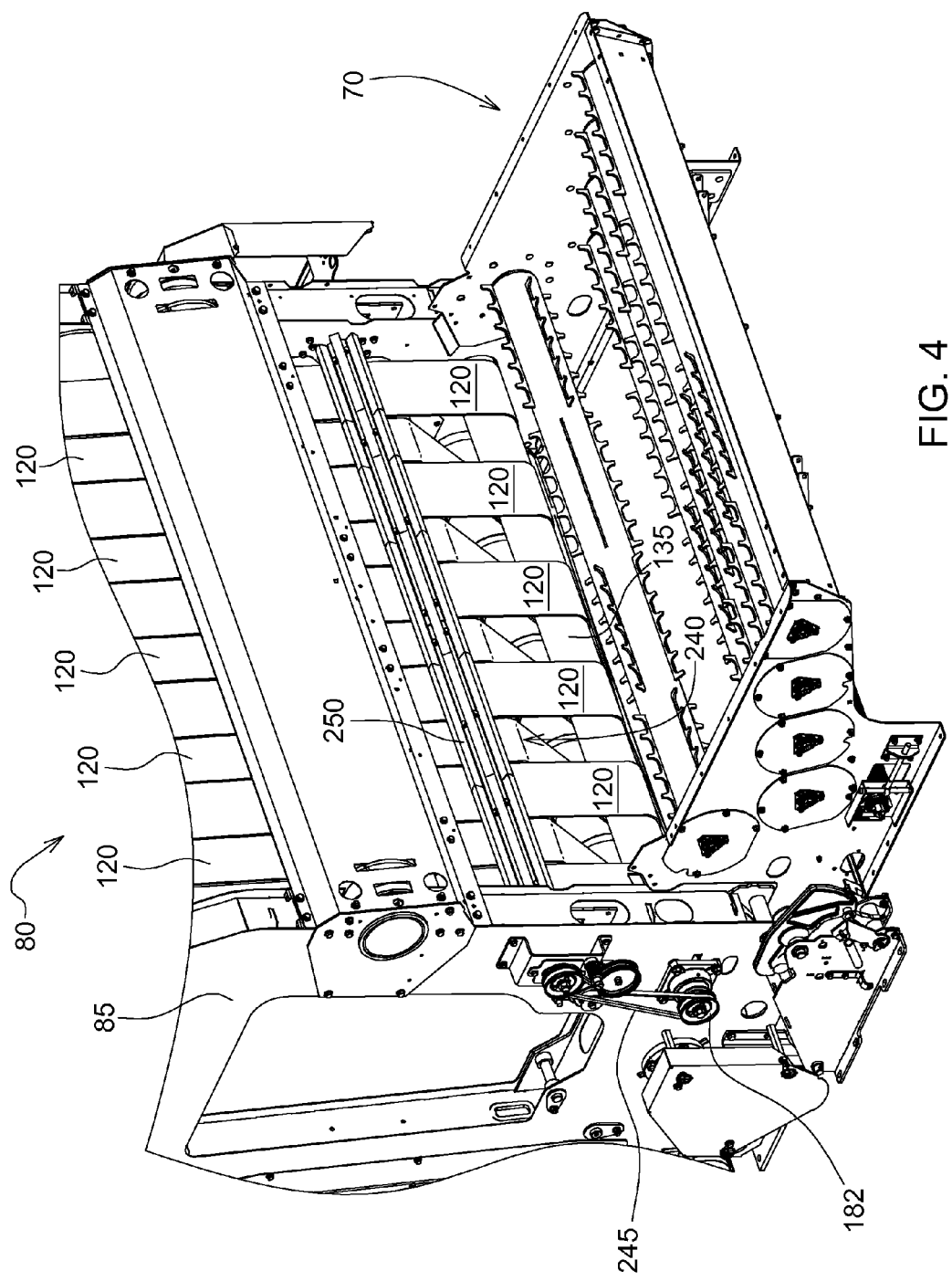
FIG. 4 is a zoomed in view of a portion of the round module builder of FIG. 1.
Figure 5:
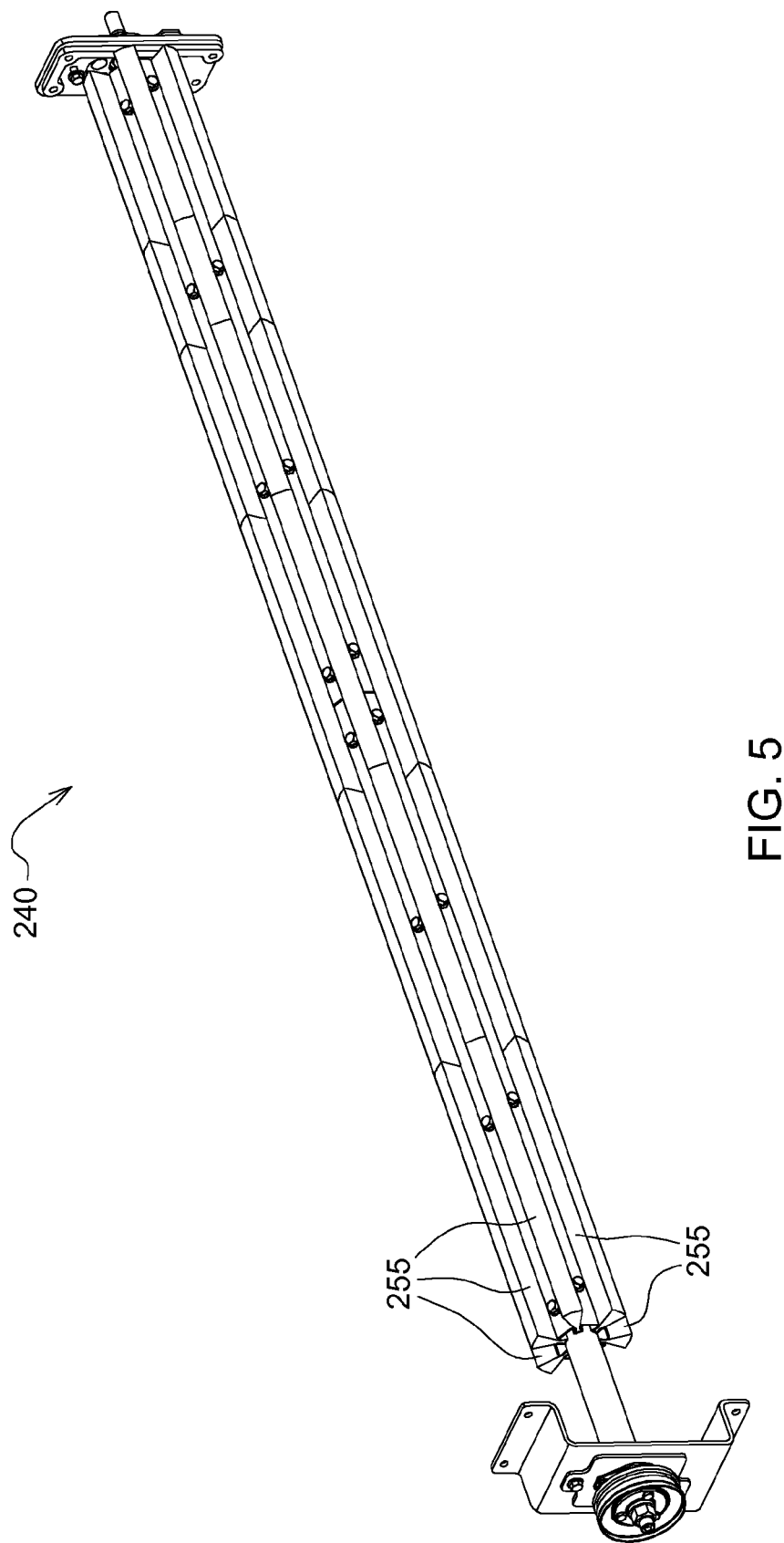
FIG. 5 is a perspective view of the powered brush of the round module builder according to another embodiment.
Figure 6:
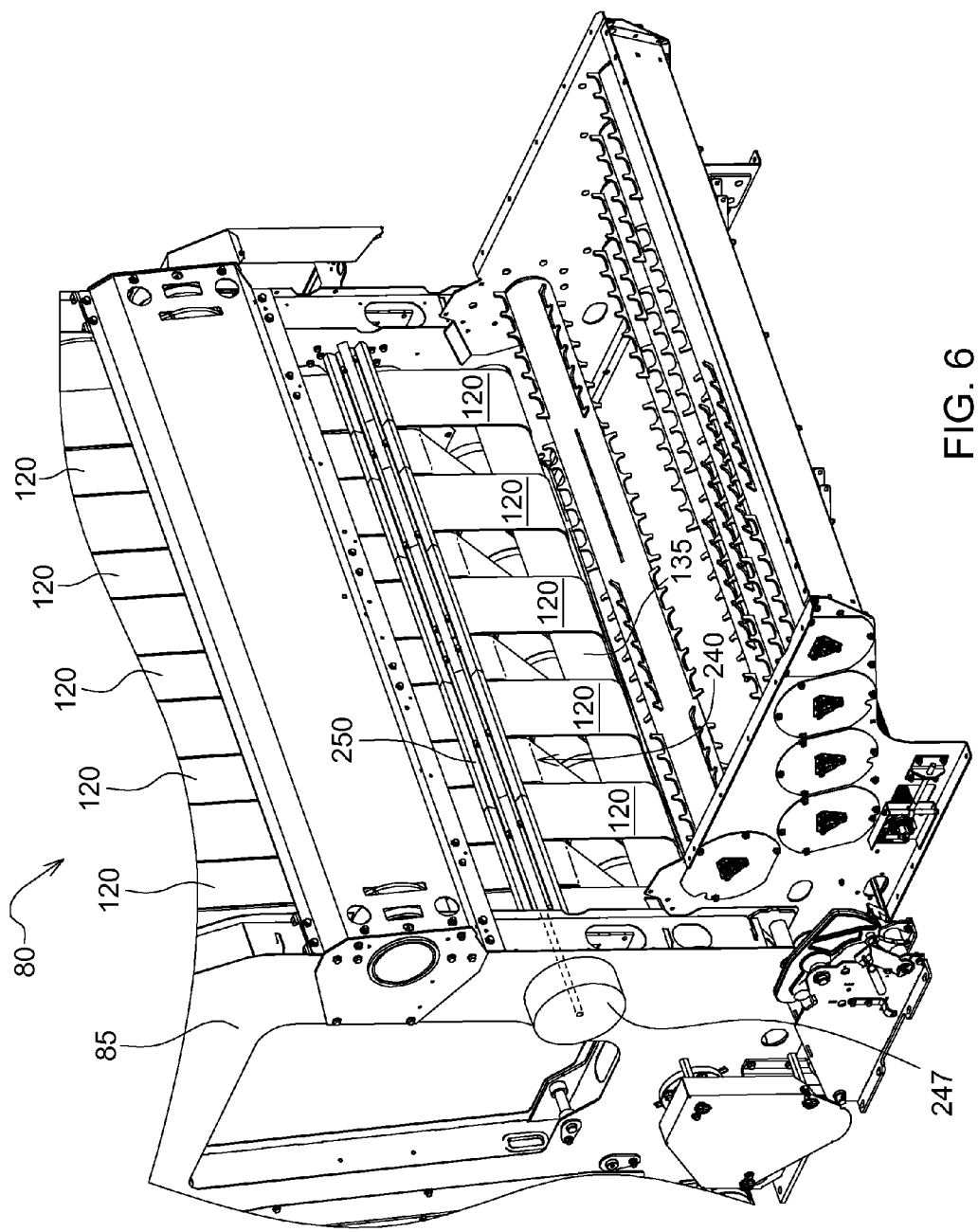
FIG. 6 is a zoomed in view of a portion of a round module builder according to another embodiment.
Figure 7:
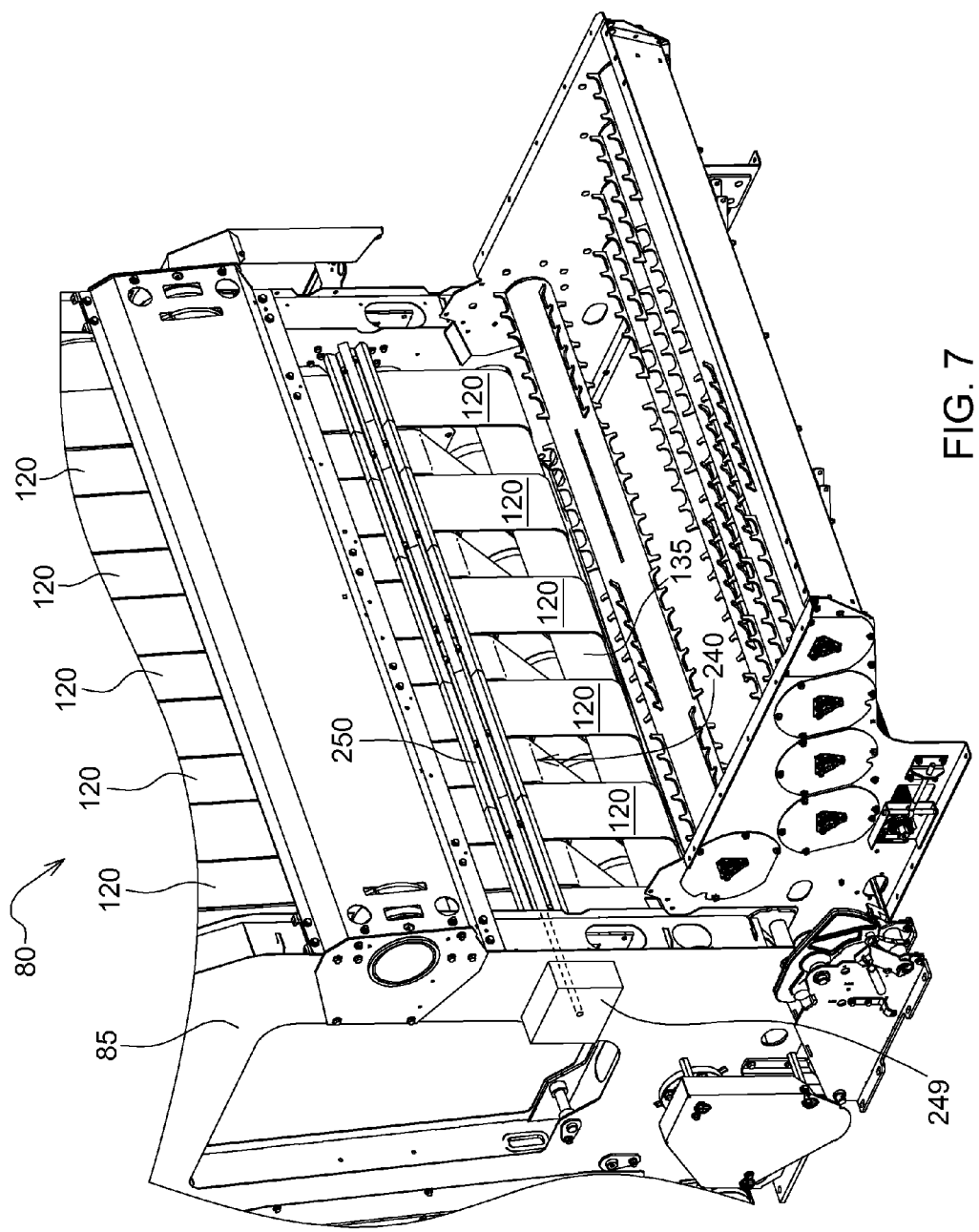
FIG. 7 is a zoomed in view of a portion of a round module builder according to another embodiment.

With reference to FIG. 4, a powered brush 240 is coupleable to the first module-forming portion 85 above the feeder 70 and positioned adjacent the plurality of baler belts 120. Alternatively, the powered brush 240 may be positioned in contact with the plurality of baler belts 120. The illustrated powered brush 240 receives power from a drive belt 245 that is driven by the baler roller sheave 182 coupled to the first separation roll 135. Alternatively, the powered brush 240 may be driven by an electric motor 247 (FIG. 6), hydraulic motor 249 (FIG. 7), or other baler roller sheave 182. The illustrated powered brush 240 comprises six equally spaced brushes 250. Referring to FIG. 5, alternatively the powered brush 240 may comprise any number of bats 255 or a combination of bats 255 and brushes 250. The bats 255 may consist of rubber or other material.

Referring to FIG. 1, a module handling system 260 is positioned adjacent the round module builder 80 for receiving the round module 100. The module handling system 260 temporarily supports the round module 100 and then discharges it from the harvester 10.

In operation, the harvester 10 is driven through the field 35 to harvest cotton or other crop. The illustrated harvesting structure 55 doffs cotton from cotton plants in the field 35. Alternatively the harvesting structure 55 may strip the cotton from the cotton plants. Cotton is transferred to the accumulator 65 via the air duct system 60. The accumulator 65 holds the cotton until a predetermined cotton level is reached and then transfers the cotton to the feeder 70. In an exemplary embodiment, the accumulator 65 transfers cotton to the feeder 70 four times for each round module 100 produced. When the feeder 70 receives cotton, the plurality of rollers 75 are activated to compress the cotton. The compressed cotton is transferred to the round module builder 80.

After the round module builder 80 receives compressed cotton, the plurality of baler belts 120 rotate the cotton into the round module 100. The powered brush 240 is initiated whenever the baler belts 120 are moving. The powered brush 240 is configured to rotate and remove the crop from the plurality of baler belts 120 outside the module-forming chamber 115 and return the crop to the feeder 70 which returns the crop to the module-forming chamber 115 where the crop is formed into the round module 100. The powered brush 240 may be rotated faster, slower, or the same speed as the plurality of baler belts 120. Advantageously, the powered brush 240 returns the crop to the feeder 70 to be baled in the module-forming chamber 115 and helps prevent the plurality of baler belts from moving off of a belt guide and/or failing.

After the round module builder 80 receives sufficient cotton from the feeder 70, the wrapping device 105 is initiated. The wrapping device 105 positions the wrap 110 onto the round module 100. The second module-forming portion 90 is then pivoted relative to the first module-forming portion 85, and the round module 100 can be ejected onto the module handling system 260. The module handling system 260 supports the round module 100 and then discharges it from the harvester 10.

Various features are set forth in the following claims.

What is claimed is:

1. A round module builder for forming a round module, the round module builder comprising:
   a feeder;
   a module-forming portion comprising at least one baler belt configured to receive a crop from the feeder, at least one baler roller sheave configured to drive the baler belt, and a module-forming chamber, the module-forming portion configured to receive the crop and rotate the crop in the module-forming chamber into the round module; and
   a powered brush coupleable to the module-forming portion above the feeder and at least one of positioned in contact with the baler belt and positioned adjacent the baler belt, the powered brush configured to remove the crop from a module-forming surface of the baler belt outside the module-forming chamber and return the crop to the feeder which returns the crop to the module-forming chamber where the crop is formed into the round module, wherein the powered brush is positioned outside of the module-forming chamber and the powered brush is not in contact with the round module during formation of the round module.

2. The round module builder of claim 1, further comprising a harvester comprising a harvesting structure configured to remove crop from a field, and an accumulator in communication with the harvesting structure for receiving crop therefrom, the feeder in communication with the accumulator for receiving crop therefrom, the feeder configured to compress the crop, and the module-forming portion in communication with the feeder for receiving crop therefrom.

3. The round module builder of claim 1, further comprising a drive belt in communication with the baler roller sheave and the powered brush to transfer power from the baler roller sheave to the powered brush to rotate the powered brush.

4. The round module builder of claim 1, wherein the powered brush is rotated at least one of faster than the baler belt, slower than the baler belt, and the same speed as the baler belt.

5. The round module builder of claim 1, further comprising an electric motor for driving the powered brush.

6. The round module builder of claim 1, further comprising a hydraulic motor for driving the powered brush.

7. The round module builder of claim 1, wherein the powered brush comprises at least one of a brush and a bat.

8. The round module builder of claim 1, wherein the powered brush comprises a roll and six brushes equally spaced around the roll.

9. The round module builder of claim 1, wherein the powered brush comprises at least one rubber bat and at least one brush.

10. The round module builder of claim 1, wherein the crop is at least one of hay, cotton, corn stalks, corn stover, straw, and silage.

11. A harvester comprising:
a harvesting structure configured to remove a crop from a field;
an accumulator in communication with the harvesting structure for receiving crop therefrom;
a feeder in communication with the accumulator for receiving crop therefrom, the feeder configured to compress the crop; and
a round module builder for forming a round module, the round module builder comprising a module-forming portion comprising at least one baler belt configured to receive a crop from the feeder, at least one baler roller sheave configured to drive the baler belt, and a module-forming chamber, the module-forming portion configured to receive the crop and rotate the crop in the module-forming chamber into the round module, and a powered brush coupleable to the module-forming portion and at least one of positioned in contact with the baler belt and positioned adjacent the baler belt, the powered brush configured to remove the crop from a module-forming surface of the baler belt outside the module-forming chamber and return the crop to the feeder which returns the crop to the module-forming chamber where the crop is formed into the round module, wherein the powered brush is positioned outside of the module-forming chamber and the powered brush is not in contact with the round module during formation of the round module.

12. The harvester of claim 11, further comprising a drive belt in communication with the baler roller sheave and the powered brush to transfer power from the baler roller sheave to the powered brush to rotate the powered brush.

13. The harvester of claim 11, wherein the harvester is a cotton harvester.

14. The harvester of claim 11, wherein the powered brush is rotated at least one of faster than the baler belt, slower than the baler belt, and the same speed as the baler belt.

15. A method for forming a round module, the method comprising:
providing a feeder;
providing a module-forming portion comprising at least one baler belt configured to receive a crop from the feeder, at least one baler roller sheave configured to drive the baler belt, and a module-forming chamber, the module-forming portion configured to receive the crop and rotate the crop in the module-forming chamber into the round module; and
initiating a powered brush coupleable to the module-forming portion, the powered brush configured to remove the crop from a module-forming surface of the baler belt outside the module-forming chamber and return the crop to the feeder which returns the crop to the module-forming chamber where the crop is formed into the round module, wherein the powered brush is positioned outside of the module-forming chamber and the powered brush is not in contact with the round module during formation of the round module.

16. The method of claim 15, further comprising providing a harvester to harvest the crop, the harvester comprising a harvesting structure for removing the crop from a field, an accumulator for receiving the crop from the harvesting structure and providing the crop to the feeder, which compresses the crop and communicates the crop to the module-forming portion.

17. The method of claim 15, wherein the crop is at least one of hay, cotton, corn stalks, corn stover, straw, and silage.

18. The method of claim 15, wherein the powered brush comprises at least one of a brush and a bat.

19. The method of claim 15, wherein the powered brush comprises at least one rubber bat and at least one brush.

20. The method of claim 15, further comprising providing a drive belt in communication with the baler roller sheave and the powered brush to transfer power from the baler roller sheave to the powered brush to rotate the powered brush.

* * * * *